United States Patent Office 3,277,160
Patented Oct. 4, 1966

3,277,160
2,3,6-TRICHLOROMANDELIC ACID AND SALTS THEREOF
Edward D. Weil, Lewiston, Jerome Linder, Niagara Falls, and Edwin Dorfman, Grand Island, N.Y., assignors to Hooker Chemical Corporation, Niagara Falls, N.Y., a corporation of New York
No Drawing. Filed June 12, 1961, Ser. No. 116,252
5 Claims. (Cl. 260—501)

This invention describes a novel halogenated aromatic acid useful as a herbicide and as an intermediate for preparing other pesticidal compositions. More particularly, this invention relates to 2,3,6-trichloromandelic acid and its salts and derivatives which are herbicidally active, and can be used as a starting material for preparing other herbicidally active compounds. The novel compositions have the structure:

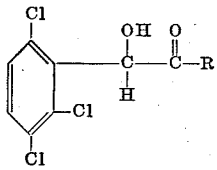

where R is a radical selected from the group consisting of alkoxy, aryloxy, amino, chloro and hydroxy.

Examples of the compounds within the scope of this invention include but are not limited to the alkyl esters such as methyl, ethyl, propyl, isopropyl, butyl, amyl and the like, hydroxy alkyl such as hydroxyethyl, hydroxypropyl, aryloxy esters such as the phenyl and naphthyl esters, substituted aryloxy such as the chlorophenyl esters and tolyl esters, amides such as the simple unsubstituted amide, substituted amides including the hydroxy amides and ethyl, methyl and other alkylamides, the acid chloride, and the free acid and its metallic and amine salts.

While all of these derivatives and salts of 2,3,6-trichloromandelic acid may be considered as herbicidal equivalents, because of the ease of formulation, the alkali metal, ammonium and lower alkyl- and lower hydroxyalkyl-substituted ammonium salts and 2,3,6-trichloromandelamide are the preferred embodiments for herbicidal use.

One of the major problems in weed control heretofore unsolved, is the eradication of deeply-rooted and refractory perennial weeds such as field bindweed, Russian knapweed, trumpet vine, tie-vine, leafy spurge, perennial milkweed and the like, without the need for repeated treatments with effective but rapidly dissipated herbicides such as 2,4-D or "one shot" treatments with long term soil sterilants such as the alkali metal chlorates, trichlorobenzoic acid or the trichlorophenylacetic acids. The former class of herbicides entail tedious and expensive expenditure of time, labor and materials while the latter class of long term sterilants while removing the weeds effectively in one application, leave the ground fallow and unsafe for agricultural use for one or more years, because of their enduring phytotoxic residues in the soil. Thus, it would be highly desirable and advantageous to have a herbicide with characteristics that allow it to effectively kill deeply-rooted perennial weeds in a single treatment at economic rates of application, while permitting the safe use of the soil within short periods of time (less than one year), after treatment.

We have unexpectedly found that the compounds of this invention posses this favorable combination of desirable properties in comparison to the related chlorobenzoic and chlorophenylacetic acid herbicides of the prior art, which, though efficacious as herbicides have unduly long persistance in the soil.

That these compositions are herbicidal at all is unexpected in that the parent compound mandelic acid and the related 4-chloromandelic acid have been shown by Weintraub et al. (Botan. Gaz. 113, 348–362 (1952)), not to be able to induce abscission (defoliation) which is usually a good indication of phytotoxic.

An additional advantage of the novel compositions of this invention is that they may be used in various states of purity ranging from the highly purified or crystalline product to a technical crude. Furthermore, these herbicidal compositions offer the advantage of compatibility with a host of other herbicides including the tri and tetrachlorophenylacetic acids and the sodium borates and calcium borates, 2,4-D and other herbicidal phenoxy aliphatic acids and esters, simazine and other herbicidal triazines, monuron, fenuron, diuron and other herbicidal ureas, sodium chlorates, sodium or calcium borates, herbicidal petroleum oils, hexachlorocyclopentadiene, pentachlorophenol, dinitro-o-alkylphenols, sodium trichloroacetate, and sodium 2,2-dichloropropionate, with fungicides such as the metal dimethyldithiocarbamates and ethylenebis-(dithiocarbamates), with insecticides such as benzene hexachloride and chlordane, with fertilizers such as urea and ammonium nitrate, and various adjuvants and diluents well known to the art. Thus, these herbicides may be used by themselves or made the subject of liquid or solid formulations ranging from the very simple to the most elegant. For example, if it is desired these compositions may be made the subject of a liquid formulation by diluting, dispersing, dissolving or emulsifying with a surface active adjuvant or combination of these adjuvants in water or organic solvents such as petroleum hydrocarbons, alcohols, ketones, esters, glycols or combinations thereof. Or alternatively, the novel herbicides may be made up as solid formulations of powders, dusts, wettable dusts, granules and pellets using solid diluents such as talcs, clays, flours, starches, diatomaceous earths, mica, alkaline earth limes, carbonates and phosphates either finely divided, granular or pelleted in form.

These solid and liquid formulations facilitate handling and application and sometimes enhance herbicidal activity to move than an additive degree.

The liquid compositions, whether solutions or dispersions of the active agents in a liquid solvent and also the wettable powder or dust compositions of this invention may contain as a conditioning agent one or more surface active agents in amounts sufficient to render the composition readily dispersible in water. By the term surface active agents are included wetting agents, dispersing agents, emulsifying agents and the like. A satisfactory but not complete list of such agents is set forth in an article in "Soap and Chemical Specialties," Vol. 31, No. 7, pages 60–61; No. 8, pages 48–61; No. 9, pages 52–67, and No. 10, pages 38 (67), 1955. Other sources of adjuvant materials is set forth in Bulletin E–607 of the Bureau of Entomology and Plant Quarantine of the United States Department of Agriculture.

The preferred embodiment in regard to formulation is the aqueous solution of the above named preferred salts, or a solid carried formulation of the amide. While the manner and method of application of the inventive compositions is varied and largely dependent upon the climatic conditions, crop treated, the weeds to be eradicated, the equipment available and the convenience of the user, a preferred embodiment of this invention is to apply these herbicides as a spray after making them up as a liquid formulation comprised of a solution of one of the preferred salts of 2,3,6-trichloromandelic acid in water, or a dispersion of the wettable powder formulation of the amide in water, optionally containing a wetting agent such as an alkylaryl sulfonate. This type of mixture is sprayed on the weed population, or on the soil to be protected from weed emergence.

The rate of application cannot be precisely stated due to varying degree of resistance possessed by the weed species and crop presently or subsequently to be grown in the treated area, the stage of weed and crop growth, the soil type and climatic conditions, but in general, the rates will be at least one-quarter of a pound of herbicide per acre and for reasons of cost will seldom exceed one hundred pounds per acre, with the preferred range falling within one-half to fifty pounds per acre. Where the weeds are annuals or are perennials in an early stage of growth, they being more susceptible, will frequently respond to the rates from one-half to five pounds per acre, while older annual weeds or established perennial weeds may require rates in excess of five pounds per acre. In those instances where the weed population has been allowed to accumulate unchecked, or where extremely sturdy plants are encountered, applications of up to fifty and even beyond this rate may be required. For eradication of deeply-rooted herbicide-resistant perennial weeds such as field bindweed, rates of five to fifty pounds are generally efficacious. In general, only a single application is required.

The 2,3,6-trichloromandelic acid may be readily prepared by various synthetic routes. For example, 2,3,6-trichlorophenylacetic acid whose preparation is disclosed in SN 692,046, filed October 24, 1957, now abandoned, may be halogenated in the alpha position and the product hydrolyzed. A preferred route for economic reasons is the treatment of 2,3,6-trichlorobenzaldehyde with hydrogen cyanide or treatment of 2,3,6-trichlorobenzaldehyde-sodium bisulfite addition product with sodium cyanide to obtain the nitrile which is then hydrolyzed to the acid by refluxing for about one hour with aqueous mineral acid. The nitrile may also be converted directly to the amide by dissolving it in concentrated sulfuric acid at fifty to one hundred degrees and adding the solution to cold water. The acid may be converted to salts, amides, esters or chloride by methods known to the art for making carboxylic acid derivatives.

None of the examples which follow are to be construed as limiting or defining this invention except as particularly set forth in the specification and claims.

*Example 1.—Preparation of 2,3,6-trichloromandelic acid and amide*

A solution of seventy grams 2,3,6-trichlorobenzaldehyde in six hundred milliliters ethyl ether was shaken vigorously with a solution of eighty grams sodium metabisulfite in one hundred and fourteen milliliters water with cooling. The solid was filtered and washed with ether. Five grams of aldehyde was recovered from the filtrate. The solid was then added to a one thousand milliliter solution of fifty grams sodium cyanide in water, with vigorous stirring. Crude 2,3,6-trichloromandelonitrile precipitated as an oil which solidified. The crude nitrile was treated with boiling thirty-five percent hydrochloric acid for eighteen hours. The crude trichloromandelic acid was taken up in ether, extracted with ten percent sodium hydroxide, cooled and precipitated with excess hydrochloric acid. The product was extracted from water with ether and isolated after boiling off the ether, in sixty percent yield based on the nitrile. The acid was obtained as a colorless crystalline solid after three recrystallizations from chloroform; melting point one hundred and forty-six to one hundred and forty-seven degrees; neutral equivalent 257.5 (theory 255.62); percent chlorine, 41.4 (theory 41.68).

The crude nitrile was converted to the amide by dissolving in ten parts by weight of concentrated sulfuric acid at seventy degrees and then pouring the solution into an excess of water and ice at zero degrees with agitation. The amide is precipitated as a white, sticky solid, which can be removed by centrifugation. The infrared spectrum indicates the presence of the amide group.

*Example 2.—Formulation of 2,3,6-trichloromandelic acid as salt in aqueous solution*

One hundred parts by weight of 2,3,6-trichloromandelic acid was stirred with five hundred parts of water, and ten percent sodium hydroxide solution was added with stirring until a pH of eight to nine was reached. The solution was then diluted up to one thousand parts with water, after adding five parts by weight of Nacconal SL (a commercial alkylaryl sulfonate wetting agent).

Similar formulations of equal effectiveness are made by using (in place of sodium hydroxide), potassium hydroxide, lithium hydroxide, ammonia, methylamine, dimethylamine, trimethylamine, triethylamine, diisopropylamine, 2-hydroxyethylamine, and diethanolamine, to obtain the potassium, lithium, ammonium, methylammonium, dimethylammonium, trimethylammonium, triethylammonium, diisopropylammonium, 2-hydroxyethylammonium and diethanolammonium salts respectively.

*Example 3.—Formulation of 2,3,6-trichloromandelic acid as emulsifiable oil*

Ten parts by weight of 2,3,6-trichlormandelic acid was mixed with approximately twelve parts of Atlox 8916P, and four parts of Atlox 3335 (commercial non-ionic emulsifiers), and made up to a total of one hundred parts by addition of a 1:1 xylene-isophorone solvent mixture to obtain a clear oil emulsifiable with water.

*Example 4.—Formulation of 2,3,6-trichloromandelamide as wettable powder*

The following ingredients are ground to a homogeneous powder in a hammer mill:

| | Parts by weight |
|---|---|
| 2,3,6-trichloromandelamide | 25 |
| Marasperse N (lignin sulfonic acid dispersing agent) | 5 |
| Sorbit P (sodium alkylarylsulfonate wetting agent) | 3 |
| Clay | 67 |

*Example 5.—Herbicidal application*

2,3,6-trichloromandelic acid and its sodium salt was applied at ten pounds per acre to a severe infestation of field bindweed (*Convolvulus arvensis*), in midsummer. Comparison plots were also left untreated, and other plots were treated with 2,3,6-trichlorobenzoic acid and 2,3,6-trichlorophenylacetic acid at the same rate. After three days, ninety percent of the bindweed treated with 2,3,6-trichloromandelic acid or its sodium salt was dead, and after one month, one hundred percent of the bindweed thus treated with dead.

In the following autumn, winter wheat was planted in the treated areas. In the areas which had been treated with 2,3,6-trichloromandelic acid or its sodium salt, the wheat germinated and grew normally. In the areas which had been treated with 2,3,6-trichlorobenzoic acid or 2,3,6-trichlorophenylacetic acid, the wheat germinated but soon became stunted and did not bear harvestable grain.

*Example 6*

A wettable powder formulation of 2,3,6-trichloromandelamide was dispersed in water and sprayed at twenty pounds per acre of active ingredient on soil infested with a mixed population of perennial weeds predominating in trumpet vine, honeysuckle, plantain, and several species of brush including sumac.

The following season, turf grasses were sowed on the treated area and grew normally.

By contrast, a minimum of one thousand pounds per acre of sodium chlorate was required to eradicate the same population of weeds in adjacent plots and turf grasses could not be grown in the treated area for two years after the treatment.

We claim:
1. A compound selected from the group consisting of

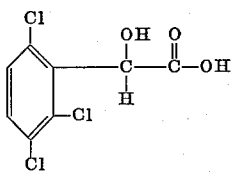

and alkali metal, ammonium, lower alkyl-substituted ammonium and lower hydroxyalkyl-substituted ammonium salts thereof.
2. Sodium 2,3,6-trichloromandelate.
3. Potassium 2,3,6-trichloromandelate.
4. Dimethylammonium 2,3,6-trichloromandelate.
5. 2,3,6-trichloromandelic acid.

References Cited by the Examiner
UNITED STATES PATENTS

| | | | |
|---|---|---|---|
| 2,146,060 | 2/1939 | Ellis | 260—521 XR |
| 2,220,692 | 11/1940 | Tabern et al. | 260—521 XR |
| 2,394,916 | 2/1946 | Jones | 71—2.6 |
| 2,405,873 | 8/1946 | Blumenfeld | 260—521 |
| 2,540,307 | 2/1951 | Weijlard et al. | 260—473 |
| 2,977,212 | 3/1961 | Tischler | 71—2.6 |
| 3,056,669 | 10/1962 | Moyle et al. | 71—2.6 |

OTHER REFERENCES

Bartell et al., Journal of Organic Chemistry, 1954, vol. 19, pp. 485–489.

Dahn et al., Chemical Abstracts, 1955, vol. 49, p. 13210.

Fernandez, Chemical Abstracts, April 1960, vol. 54, p. 7052.

Mitchell, "Science," vol. 118, 1953, pp. 518–519.

"Plant Regulators," CBCC Positive Data Series, No. 2, June 1955, Nat. Research Council, pub. 384, pages a, b, c, 1 and 34.

Reeve et al., Journal of American Chemical Society, 1957, vol. 79, pp. 1932–1934.

Thompson et al., Chemical Abstracts, 1947, vol. 41, pp. 3902–3912.

CHARLES B. PARKER, *Primary Examiner.*

MAURICE A. BRINDISI, JULIAN S. LEVITT,
*Examiners.*

JAMES O. THOMAS, EDWARD J. MEROS, DALE R. MAHANAND, *Assistant Examiners.*